United States Patent [19]

Harada

[11] Patent Number: 5,546,284
[45] Date of Patent: Aug. 13, 1996

[54] AUTOMOBILE HEADLAMP WITH EXTENSION REFLECTOR MOUNTED ON THE FRONT LENSE

[75] Inventor: Tatsuhiko Harada, Shizuoka, Japan

[73] Assignee: Koito Manufacturing Co., Ltd., Tokyo, Japan

[21] Appl. No.: 420,817

[22] Filed: Apr. 12, 1995

[30] Foreign Application Priority Data

Apr. 19, 1994 [JP] Japan .................................. 6-081173

[51] Int. Cl.⁶ .................................................. B60Q 1/04
[52] U.S. Cl. ............................ 362/61; 362/245; 362/297; 362/327; 362/346
[58] Field of Search .............................. 362/61, 240, 245, 362/297, 327, 346, 328

[56] References Cited

U.S. PATENT DOCUMENTS

| | | | |
|---|---|---|---|
| 5,172,972 | 12/1992 | Terao | 362/61 |
| 5,285,358 | 2/1994 | Watanabe et al. | 362/61 |
| 5,287,101 | 2/1994 | Serizawa | 362/61 |
| 5,353,204 | 10/1994 | Kawamura | 362/61 |
| 5,373,423 | 12/1994 | Liedtke | 362/61 |
| 5,394,310 | 2/1995 | Iwasaki | 362/61 |

*Primary Examiner*—Ira S. Lazarus
*Assistant Examiner*—Alfred Basichas
*Attorney, Agent, or Firm*—Sughrue, Mion, Zinn, Macpeak & Seas

[57] ABSTRACT

An automobile headlamp includes: a lamp body having a front opening; a headlamp body having a light source and a reflector provided inside the lamp body; an extension reflector provided around the headlamp body for hiding the inside of the lamp body, the extension reflector having a mirror surface; and a front lens engaging with the front opening of the lamp body. The front lens has side walls, steps formed on the side walls of the front lens so as to decrease the distance between the front edges of the side walls, and a plurality of thick portions formed behind the steps on the inner surfaces of the side walls of the front lens, the thick portions to which the extension reflector is connected with screws.

14 Claims, 6 Drawing Sheets

AUTOMOBILE HEADLAMP WITH EXTENSION REFLECTOR MOUNTED ON THE FRONT LENSE

BACKGROUND OF THE INVENTION

1. Field of the Invention

The present invention relates to an automobile headlamp in which an extension reflector having a mirror surface is provided in a lamp body to hide components disposed around a headlamp body.

2. Related Art

Figure 8:
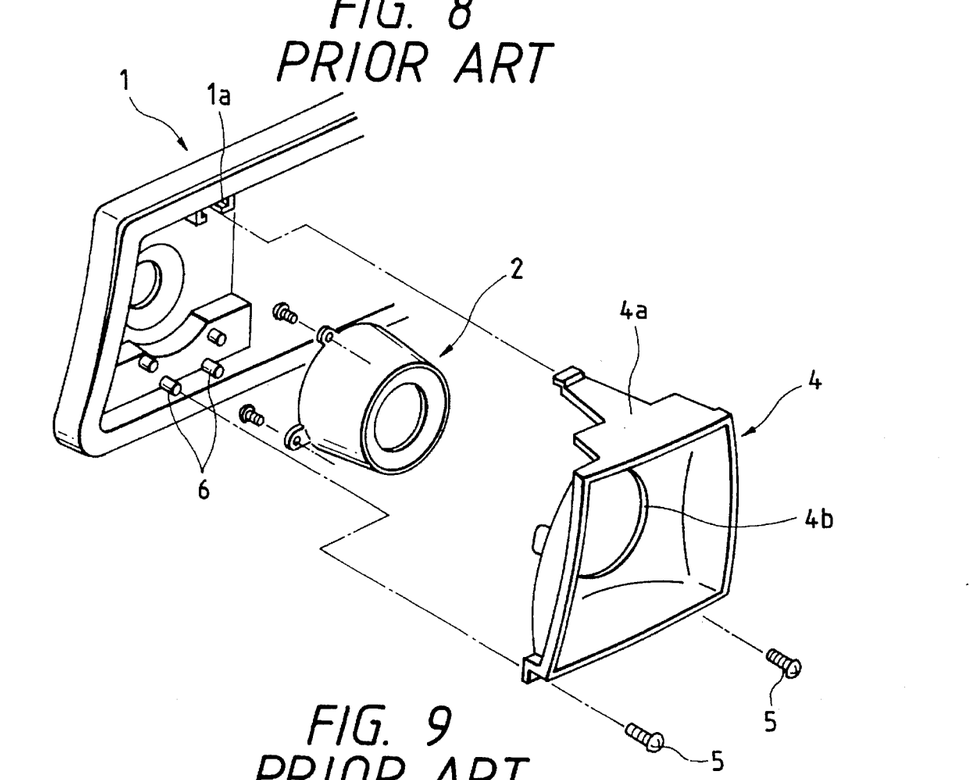
FIG. 8 is an exploded perspective view showing essential components of a first example of a conventional headlamp.

FIG. 8 shows a first example of a conventional headlamp of this type. A projection type headlamp body 2 made up of a reflector, a light source, and a projection lens is fixedly secured to the front of a lamp body 1 with screws. An extension reflector 4 having a mirror surface is specular in color is provided to surround the headlamp body 2, to hide the inside of the lamp body 1 and to show the whole interior of the lamp body 1 like a mirror. As shown in FIG. 8, a leg 4a extending from the extension reflector 4 engages with an engaging groove 1a formed in the lamp body 1, and an edge portion of the extension reflector 4 which is opposite to the edge portion from which a leg 4a extends is secured to the lamp body 1 with screws 5, so that the extension reflector 4 is fixedly secured to the lamp body 1. Further, a round hole 4b is formed in the extension reflector 4. When the extension reflector 4 is secured to the lamp body 1 in the above-described manner, the front end portion of the headlamp body 1 comes in the round hole 4b of the extension reflector 4.

Figure 9:
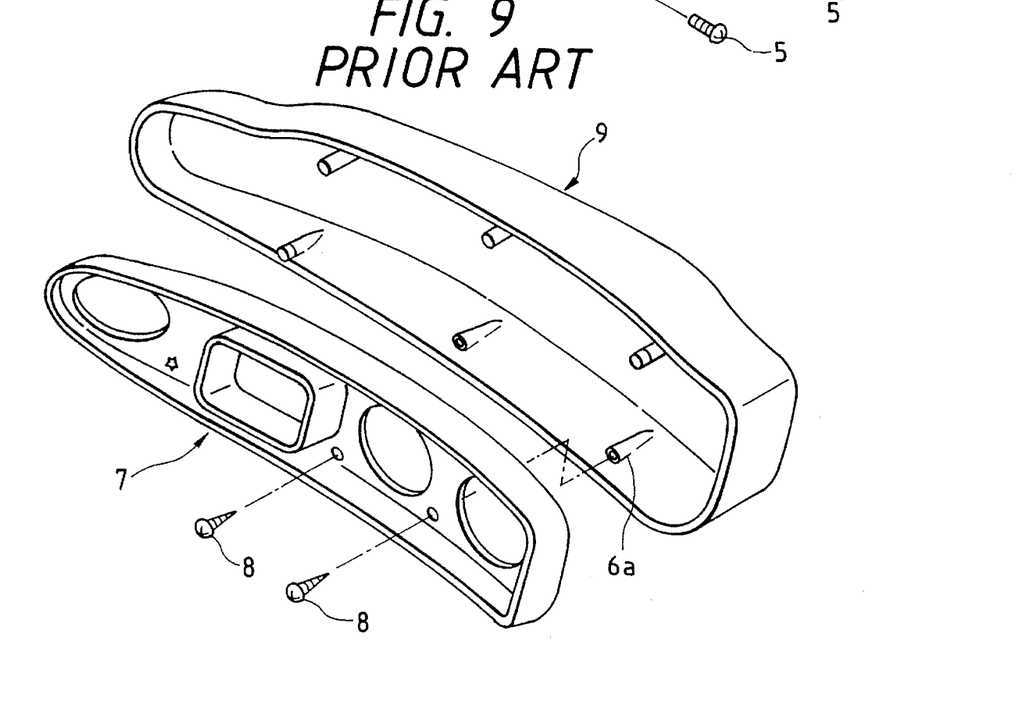
FIG. 9 is also an explode perspective view showing essential components of a second example of the conventional headlamp.

A second example of the conventional headlamp as disclosed in Unexamined Japanese Utility Model Publication No. Hei. 6-13008 includes, as shown in FIG. 9, thick portions 6a formed on an inner surface of a side wall of a front lens 9 and an extension reflector 7 fixedly secured to the thick portions 6a of the front lens 9 with screws 8.

In the first example of the conventional headlamp, the extension reflector 4 is secured to the rear wall of the lamp body 1 although it is greatly spaced therefrom. Hence, it is necessary to provide the long leg 4a extending from the extension reflector, and to form extension reflector supports 6 on the lamp body 1. That is, the conventional headlamp is disadvantageous in that it is rather intricate in structure, and the long leg 4a may be vibrated to generate chattering noises.

In general, the headlamp is so designed that the headlamp body 2 is tilted with respect to the lamp body 1 by means of an aiming mechanism. Hence, the extension reflector 4 has to be designed upon consideration of the tilting angle of the headlamp body 2, that is, it may not interfere with the headlamp body 2. Thus, the conventional headlamp suffers from difficulties that the extension reflector is limited in design of configuration, and the lamp body is unavoidably bulky.

The second example of the headlamp is free from the difficulties accompanying the first example. However, it still suffers from another problem that the thick portions 6a of the front lens 9 in which the connecting screws are screwed are visible through the front lens 9; that is, the headlamp is poor in external appearance.

SUMMARY OF THE INVENTION

In view of the foregoing, a first object of the invention is to provide an automobile headlamp in which the extension reflector is fixedly secured to the front lens so that it is prevented from vibration, and the lamp body can be made compact in size.

A second object of the invention is to provide an automobile headlamp having a member for fixing the extension reflector to the front lens which does not deteriorated the external appearance of the headlamp.

In order to achieve the foregoing objects, the first aspect of the invention provides an automobile headlamp comprising: a lamp body having a front opening; a headlamp body having a light source and a reflector provided inside the lamp body; an extension reflector provided to surround the headlamp body for hiding the inside of the lamp body, the extension reflector having a mirror surface; and a front lens engaging with a front opening of the lamp body. The front lens is provided with side walls, steps formed on the side walls of front lens so as to decrease the distance between the front edges of the side walls, and a plurality of thick portions formed behind the steps on inner surfaces of the side walls of the front lens, the thick portions to which the extension reflector is connected with screws.

The second aspect of the invention provides the automobile headlamp of the first aspect, wherein outer surfaces of the side walls of the front lens are coated with light shielding material.

The third aspect of the invention provides the automobile headlamp of the first aspect, wherein the automobile headlamp further comprises an auxiliary lamp chamber and an auxiliary lamp body provided adjacent to the headlamp body inside the lamp body, and wherein the extension reflector is formed integrally with a part of the auxiliary lamp chamber.

The extension reflector disposed around the headlamp body is connected to the side walls of the front lens at several points with the screws so that the side walls are located close to the extension reflector rather than to the lamp body. Hence, the headlamp of the invention is not so limited in design of configuration as the conventional headlamp; for instance, it is free from the difficulty accompanying the first example of the conventional automobile headlamp that is, the extension reflector does not require the long leg through which the extension reflector is connected to the lamp body; that is, the headlamp of the invention can be made simple in structure. Further, it does not increase the size of the lamp body.

In general, in an automobile headlamp, a front lens is small in wall thickness and, therefore, it is impossible to form threaded holes in the same. On the other hand, in the headlamp of the invention, the thick portions are formed on the inner surfaces of the side walls of the front lens, and threaded holes are formed in the thick portions with which the screws engage to connect the extension reflector thereto. Hence, in the headlamp, the extension reflector is positively secured.

The thick portions formed on the inner surfaces of the side walls of the front lens are hidden by the steps formed on the side walls of the front lens, that is, they are not visible through the front wall of the front lens.

In the headlamp of the second aspect of the invention, the connections where the extension reflector and the front lens are connected to each other with the screws, are hidden by the light-shielding material coated onto the outer surfaces of the side walls of the front lens.

In the headlamp of the third aspect, the extension reflector is integrally formed with a member which is a part of the lamp chamber of the auxiliary lamp.

DETAILED DESCRIPTION OF THE PREFERRED EMBODIMENTS

One preferred embodiment of the invention will be described with reference to the accompanying drawings.

Figure 1:
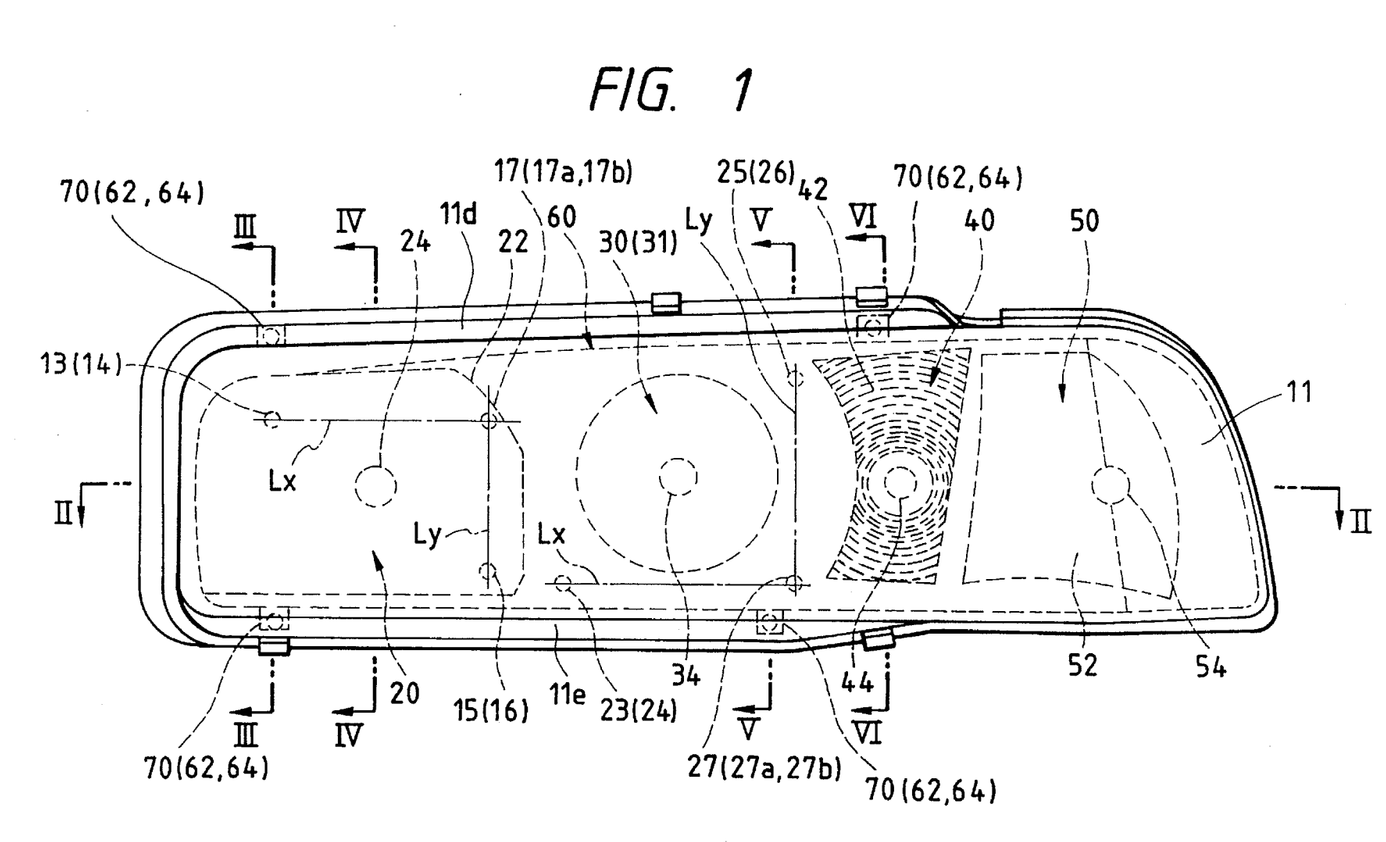
FIG. 1 is a front view of an automobile combination headlamp of the invention.
Figure 2:
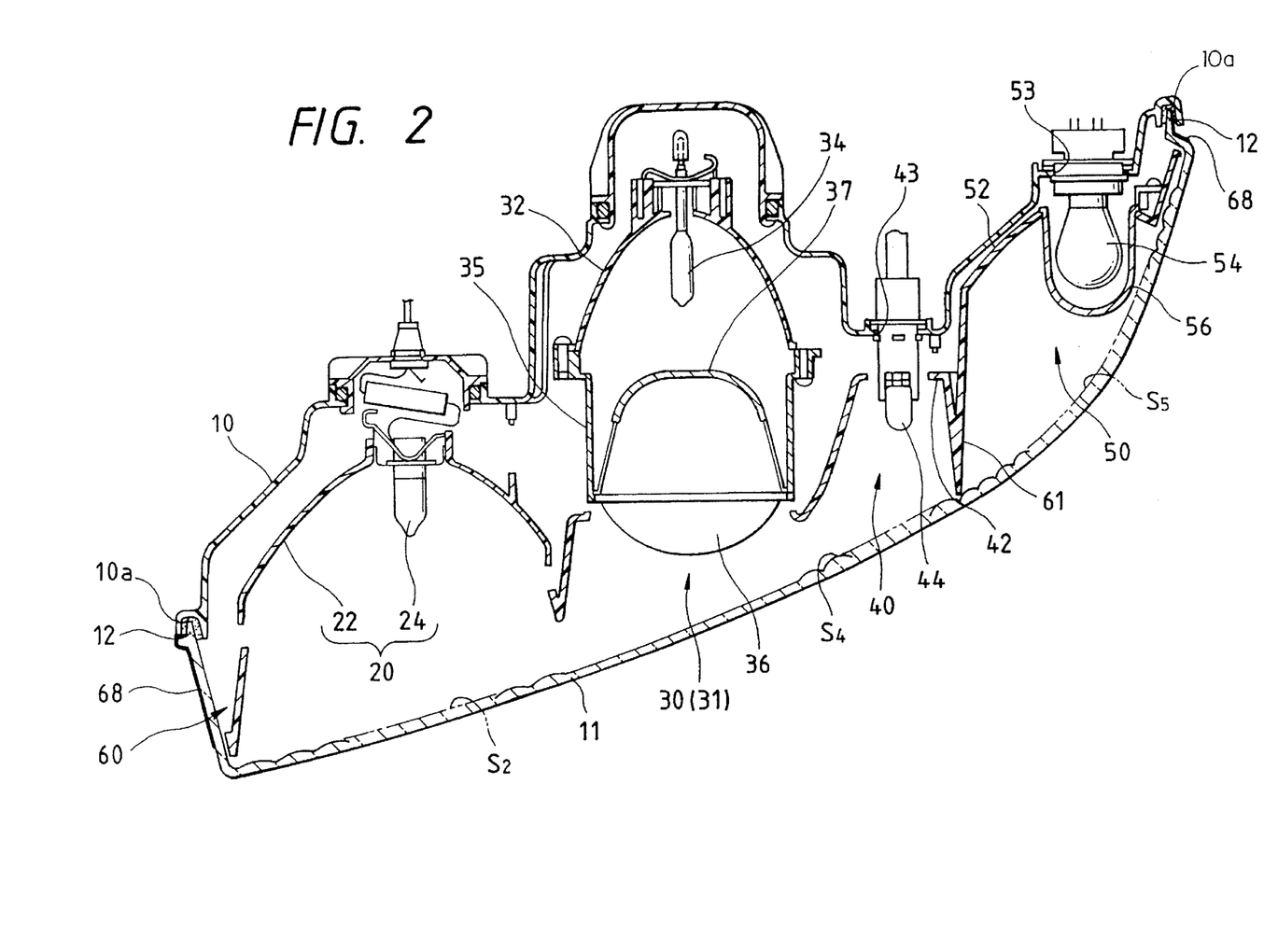
FIG. 2 is a horizontal sectional view taken along line II—II in FIG. 1.
Figure 3:
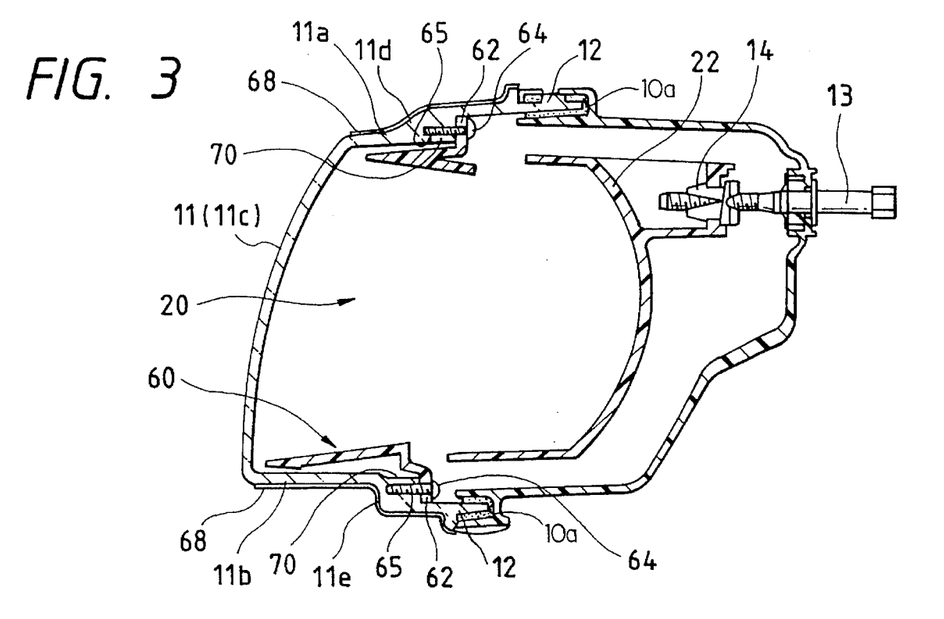
FIG. 3 is a vertical sectional view taken along line III—III in FIG. 1.
Figure 4:
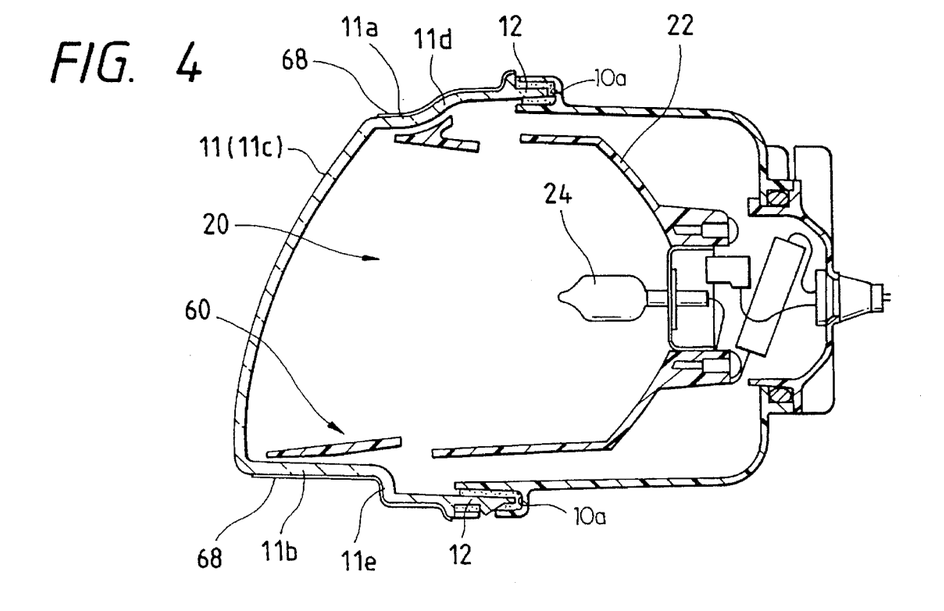
FIG. 4 is a vertical sectional view taken along line IV—IV in FIG. 1.
Figure 5:
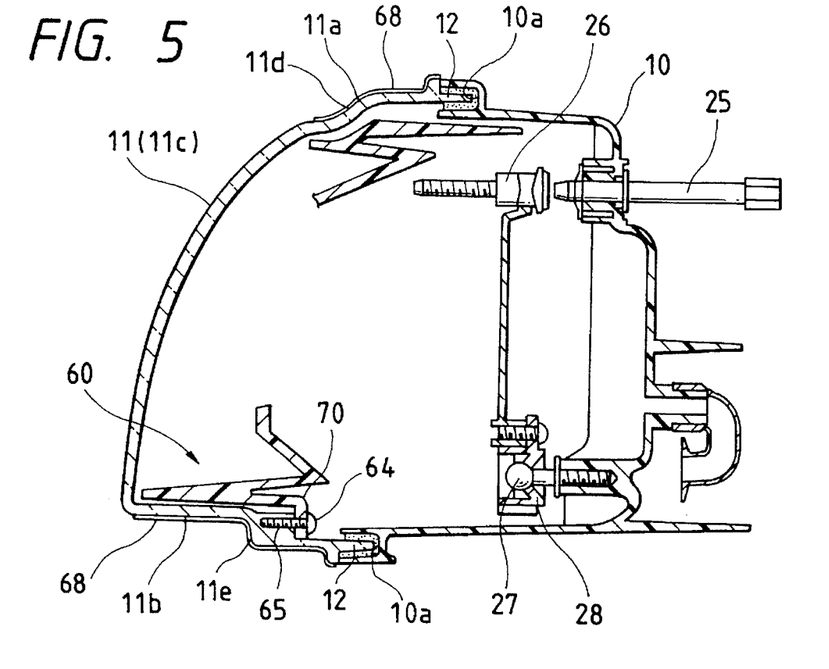
FIG. 5 is a vertical sectional view taken along line V—V in FIG. 1.
Figure 6:
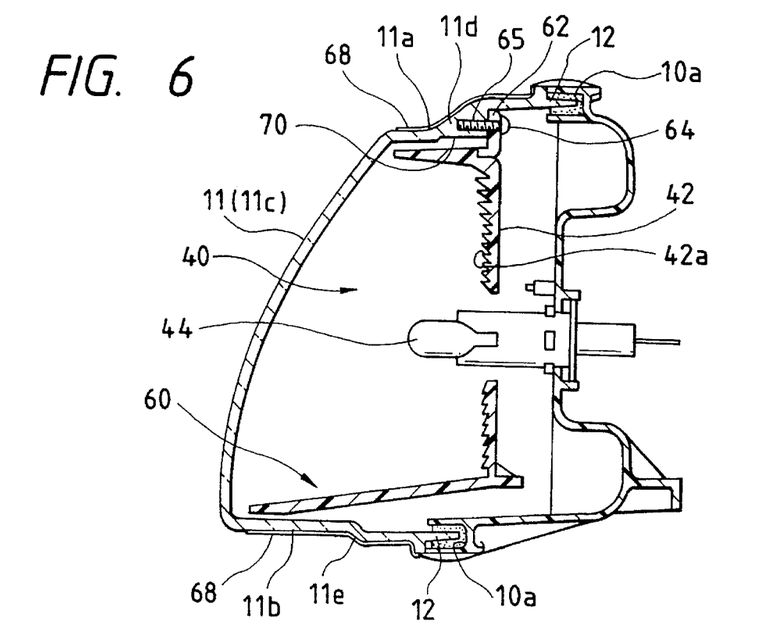
FIG. 6 is a vertical sectional view taken along line VI—VI in FIG. 1.
Figure 7:
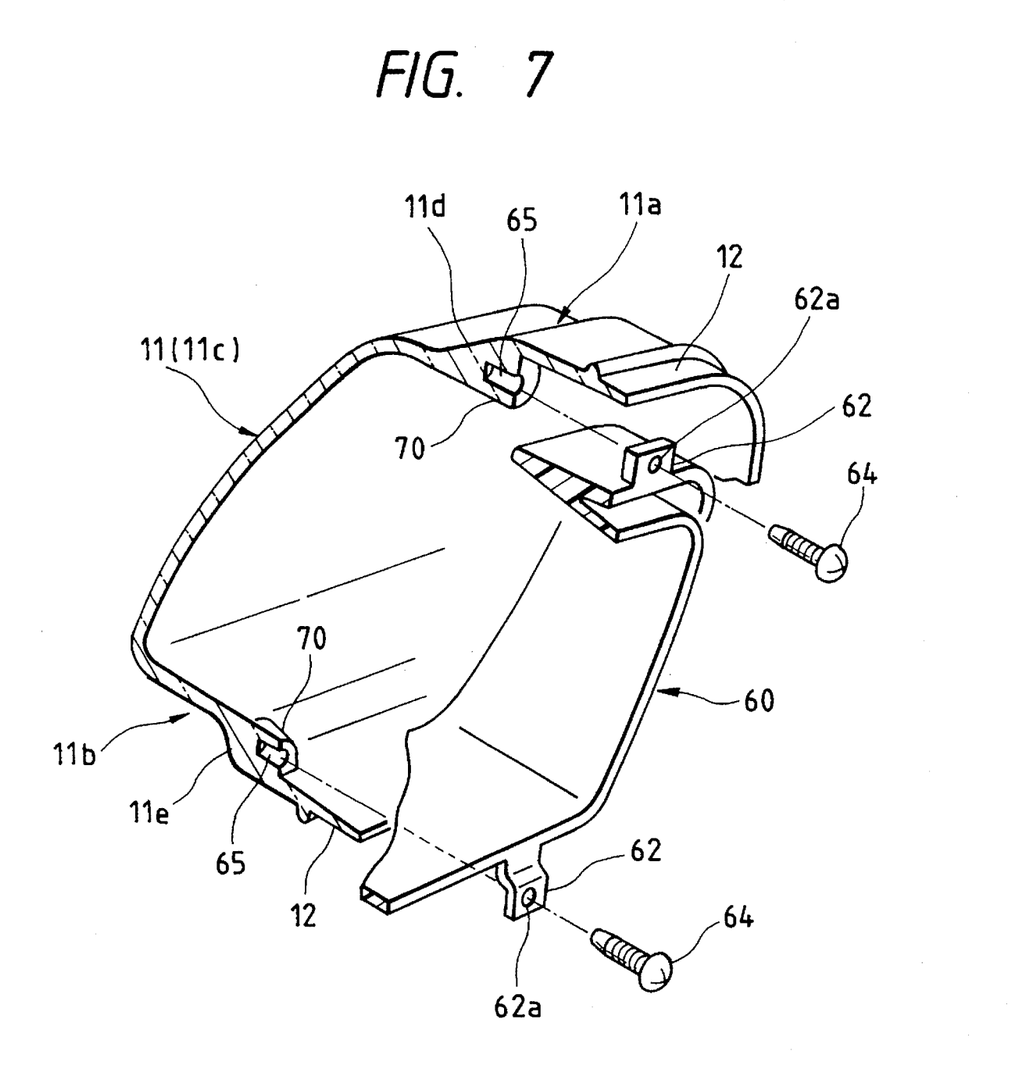
FIG. 7 is an exploded perspective view for showing the connection of an extension reflector and a front lens with screws.

FIGS. 1 through 7 show an embodiment of the invention. FIG. 1 is a front view of an automobile combination headlamp. FIG. 2 is a horizontal sectional view (taken along line II—II in FIG. 1) of the headlamp shown in FIG. 1. FIGS. 3, 4, 5 and 6 are vertical sectional views taken along lines III—III, IV—IV, V—V, and VI—VI, respectively, in FIG. 1, respectively. FIG. 7 is an exploded perspective view showing the connections of an extension reflector and a front lens with screws.

In those figures, a cup-shaped lamp body 10 has a front opening. A front lens 11 engages with the front opening of the lamp body 10, thus defining a lamp chamber which is curved laterally from front. Further in the figures, a seal groove 10a is formed in an edge of the front opening of the lamp body 10. A seal leg 12 is formed in a front edge of the side wall of the front lens 11 which engages with the seal groove 10a. A first headlamp body 20 for emitting a main beam, a second headlamp body 30 for emitting a main beam and a low beam, a clearance lamp body 40, and a turn signal lamp body 50 are juxtaposed in the lamp chamber defined by the lamp body 10 and the front lens 11.

The first headlamp body 20 comprises: a parabolic reflector 22 which is subjected to a surface-treatment such as aluminum by vacuum deposition; and a light bulb 24 fitted in a bulb inserting hole formed in the parabolic reflector 22. The light emitting from the light bulb 24 is reflected by the parabolic reflector 22, advances forwardly as a parallel beam, and then distributed suitably by light distribution control steps $S_2$ formed on the rear surface of the front lens 11.

The second headlamp body 30 is constituted by a projection lamp unit which comprises: a reflector 32 which is substantially in the form of an ellipsoid; a light bulb 34 fitted in a bulb inserting hole formed in the reflector 32; and a projection lens 36 which engages through a lens holder 35 with the front opening of the reflector 32. A low-beam forming shade 37 positions inside the lens holder 35 at a second focal point of the projection lens 36. The shade 37 cuts off a part of the light beam advancing towards the projection lens 36 from the reflector, thus forming a low beam. The upper edge of the shade 37 forms the clear cut line of the low beam. That is, the light beams of the first and second headlamp bodies 20 and 30 are combined to form the main beam, and the light beam of the second headlamp body provides the low beam.

The first headlamp body 20 is supported by a pair of aiming screws 13 and 15 and one ball joint 17 in such a manner that it is tiltable with respect to the lamp body 10, and the second headlamp 30 is also supported by a pair of aiming screws 23 and 25 and one ball joint 27. A pair of nuts 14 and 16 engages with the aiming screws 13 and 15, respectively. Similarly, nuts 24 and 26 engages with the aiming screws 23 and 25, respectively. A supporting portion 17b supports a ball portion 17a formed on the rear wall of the lamp body, and is coupled to the reflector 22. Similarly, a supporting portion 27b supports a ball portion 27a formed on the rear wall of the lamp body, and is coupled to the reflector 32. That is, the headlamp body 20 is so supported that it is tiltable about both a horizontal axis Lx and a vertical axis Ly, as shown in FIG. 1, and the headlamp body 30 is also so supported that it is tiltable about both a horizontal axis Lx and a vertical axis Ly. Hence, the headlamp bodies 20 and 30 can be adjusted in the direction of irradiation by turning the aiming screws 13 and 15 and the aiming screws 23 and 15, respectively.

The clearance lamp body 40 comprises: a reflector 42 which extends substantially vertically and has a multiple reflection surface 42a; and a light bulb 44 which is inserted into a bulb inserting hole 43 formed in the rear wall of the lamp body 10 such that it protrudes forwardly of the reflector 42. The light beam emitting from the bulb is reflected by the reflector 42, advances as a parallel beam forwardly, and then it is diffused horizontally (right and left) by cylindrical steps $S_4$ formed on the rear surface of the front lens 11.

The turn signal lamp body 50 comprises: a parabolic reflector 52; and a light bulb 54 fitted in a bulb inserting hole 53 formed in the rear wall of the lamp body 10 such that it protrudes forwardly of the reflector 52. The light beam (white light) emitting from the light bulb 54 is slightly amber colored after passing through an amber globe 56. The light beam of the light bulb 54 is reflected by the reflector 52, advances as a parallel beam forwardly, and then it is diffused horizontally (right and left) by cylindrical steps $S_4$ formed on the rear surface of the front lens 11.

An extension reflector 60 extends forwardly along the upper and lower and right and left walls of the front lens 11 from the vicinities of the edge of the opening of the reflector 22 of the first headlamp body 20 and the front edge of the lens holder 35 of the second headlamp body 30. The extension reflector has a rectangular frame shape. An aluminum layer is formed on the surface of the extension reflector 60 by vacuum deposition similarly as in the case of the reflector 22, so that the components disposed around the headlamp bodies 20 and 30 are not visible from front, and the whole inside of the lamp chamber is specular like a mirror, which contributes to improvement of the external appearance of the headlamp.

The extension reflector 60 includes as parts thereof the reflector 42 of the clearance lamp, the reflector 52 of the turn signal lamp, and a partition wall 61 which defines the lamp chambers of the clearance lamp and the turn signal lamp. The extension reflector 60 is secured to the front lens 11 with screws as described later, so that it is suitably positioned with respect to the headlamp bodies 20 and 30 and the light bulbs 44 and 54.

Brackets 62 are formed on upper and lower edges of the extension reflector 60 in such a manner that they protrude vertically with predetermined distances between them and have screw inserting holes 62a. Thick portions 70 are formed on the inner surfaces of the upper and lower walls 11a and 11b of the front lens 11 at positions which correspond to the positions of the brackets 62 of the extension reflector. The thick portions 70 have threaded holes 65 with which mounting screws 64 engage. As shown in FIG. 7, with the brackets 62 in alignment with the thick portions 70, the screws engage with the threaded hole 65, so that the extension reflector 60 is fixedly secured to the front lens 11. Under this condition, the seal leg 12 of the front lens 12 engage with the seal groove 10a of the lamp body 10, so that the extension reflector 60 is fixedly positioned with respect to the lamp bodies 20 and 30 and the light bulbs 34 and 44.

The upper and lower walls 11a and 11b of the front lens 11 have steps 11d and 11e, respectively, which reduces the distance between the front edges of the upper and lower walls 11a and 11b (i.e., the vertical length of the front wall 11c) of the front lens 11. The thick portions 70, which are used for threadable engagement, are provided just behind the steps 11d and 11e. Hence, the thick portions 70, being covered by the steps 11d and 11e, are not visible through the front wall 11c of the front lens 11. That is, the thick portions will not deteriorate the external appearance of the headlamp.

The front lens 11 is elongated horizontally. As the front lens 11 is increased in horizontal length, a middle portion of which is liable to warp inwardly or outwardly, so that the seal leg 12 of the front lens may not suitably engage with the seal groove 10a of the lamp body, or the former 12 may not sealingly engage with the latter 10a. However, in the embodiment, the upper and lower walls 11a and 11b of the front lens 11 have the steps 11d and 11e in the above-described manner, so that those walls of the front lens are increased in rigidity, which prevents the walls from warping inwardly or outwardly.

The side walls of the front lens 11 are coated with light shielding material as indicated at 68, so that the leakage of light through the side walls is prevented, and the junctions (especially the connecting screws 64) of the extension reflector 60 and the front lens 11 are prevented from becoming visible through the side walls.

As is apparent from the above description, in the automobile headlamp of the invention, the extension reflector disposed to surround the headlamp body is connected to the side walls of the front lens at several points with the screws which side walls are located close to the extension reflector rather than the lamp body. Hence, the headlamp of the invention is less limited in design of configuration than the conventional headlamp, and can be made simple in structure. Further, it does not increase the size of the lamp body.

Furthermore, in the headlamp of the invention, the thick portions are formed on the inner surfaces of the side walls of the front lens, and the extension reflector is connected to the thick portions thus formed. Hence, the extension reflector will never generate an undesirable chattering noise even when vibrated.

Moreover, the thick portions formed on the inner surfaces of the side walls of the front lens are hidden by the steps formed on the side walls of the front lens; that is, they are not visible through the front wall of the front lens. Accordingly, the formation of the thick portions will not deteriorate the external appearance of the headlamp.

Still further, the connections of the extension reflector and the front lens with the screws are hidden by the light-shielding material applied to the outer surfaces of the side walls of the front lens, thus good external appearance of the headlamp can be maintained.

Still further, the extension reflector is integral with the lamp chamber forming member of the auxiliary lamp. Hence, the headlamp of the invention is smaller in the number of components and accordingly simple in construction compared to a headlamp in which the extension reflector is separately provided from the lamp chamber forming member of the auxiliary lamp.

What is claimed is:

1. An automobile headlamp comprising:

a lamp body having a front opening;

a headlamp body provided inside said lamp body, said headlamp body having a light source and a reflector;

an extension reflector provided around said headlamp body for hiding the inside of said lamp body, said extension reflector having a mirror surface;

a front lens engaging with said front opening of said lamp body, said front lens comprising, side walls including an upper wall and a lower wall, a step formed on at least one of said upper wall and said lower wall of said front lens so as to decrease the distance between the front edges of said upper wall and said lower wall, and a plurality of thick portions formed behind said step on an inner surface of said corresponding ode of said upper wall and said lower wall of said front lens; and mounting means for mounting said extension reflector inside said thick portions of said front lens.

2. The automobile headlamp according to claim 1, wherein outer surfaces of said side walls of said front lens are coated with light shielding material.

3. The automobile headlamp according to claim 1, further comprising all auxiliary lamp chamber and an auxiliary lamp body provided adjacent to said headlamp body inside said lamp body, wherein said extension reflector is integrally formed with a part of said auxiliary lamp chamber.

4. The automobile headlamp according to claim 1, wherein said lamp body comprises a plurality of lamp chambers inside said lamp body, wherein said extension reflector extends over all of said lamp chambers.

5. The automobile headlamp according to claim 1, wherein said extension reflector comprises brackets protruding from edges of said extension reflector at corresponding positions to said thick portion of said front lens.

6. The automobile headlamp according to claim 1, wherein said mounting means comprises a screw.

7. The automobile headlamp according to claim 6, wherein said extension reflector comprises brackets protruding from the edges of said extension reflector at corresponding positions to said thick portion of said front lens.

8. The automobile headlamp according to claim wherein at least one of said brackets of said extension reflector comprises a screw inserting hole.

9. The automobile headlamp according to claim 1, wherein an aluminum layer is formed on said surface of said extension reflector by vacuum deposition.

10. The automobile headlamp according to claim 1, further comprising an aiming screw for connecting said headlamp body with said lamp body.

11. The automobile headlamp according to claim 1, wherein said reflector of said head lamp body has a parabolic shape.

12. The automobile headlamp according to claim 1, wherein said reflector comprises a multiple reflection surface.

13. The automobile headlamp according to claim 1, further comprising:

a clearance lamp body provided adjacent to said headlamp body inside said lamp body, said clearance lamp body having a clearance light source and a clearance reflector; and a turn signal lamp body provided adjacent to said clearance lamp body inside said lamp body, said clearance lamp body having a turn signal light source, a turn signal reflector and an amber globe covering a front of said turn signal lamp body.

14. An automobile headlamp comprising:

a lamp body having a front opening;

a headlamp body provided inside said lamp body, said headlamp body having a light source and a reflector;

an extension reflector provided around said headlamp body for hiding the inside of said lamp body, said extension reflector having a mirror surface;

a front lens engaging with said front opening of said lamp body, said front lens comprising, side walls including an upper wall and a lower wall, an upper step formed on said upper wall of said front lens so as to decrease the distance between the front edges of said upper wall and said lower wall, an upper thick portion formed behind said upper step on an inner surface of said upper wall of said front lens, a lower step formed on said lower wall of said front lens so as to decrease the distance between the front edges of said lower wall and said upper wall, a lower thick portion formed behind said lower step on an inner surface of said lower wall of said front lens; and mounting means for mounting said extension reflector to said upper and lower thick portions of said front lens.

\* \* \* \* \*